US 9,045,187 B2

(12) United States Patent
Komatsu et al.

(10) Patent No.: US 9,045,187 B2
(45) Date of Patent: Jun. 2, 2015

(54) SADDLE-RIDE TYPE VEHICLE

(71) Applicant: HONDA MOTOR CO., LTD., Tokyo (JP)

(72) Inventors: Yoji Komatsu, Wako (JP); Takuma Koishikawa, Wako (JP); Keita Mikura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 71 days.

(21) Appl. No.: 13/901,713

(22) Filed: May 24, 2013

(65) Prior Publication Data

US 2013/0320719 A1 Dec. 5, 2013

(30) Foreign Application Priority Data

May 31, 2012 (JP) ................. 2012-125071

(51) Int. Cl.
| | | |
|---|---|---|
| *B62J 1/00* | (2006.01) | |
| *B62J 1/28* | (2006.01) | |
| *B62J 7/04* | (2006.01) | |
| *B62K 19/30* | (2006.01) | |
| *B62K 19/40* | (2006.01) | |

(52) U.S. Cl.
CPC ..... *B62J 1/28* (2013.01); *B62J 7/04* (2013.01); *B62K 19/30* (2013.01); *B62K 19/40* (2013.01)

(58) Field of Classification Search
CPC ................. B62J 1/00; B62J 1/08; B62J 1/14; B62J 1/28
USPC ........................................ 297/188.01, 195.1
See application file for complete search history.

(56) References Cited

U.S. PATENT DOCUMENTS

| | | | | |
|---|---|---|---|---|
| 3,850,353 | A * | 11/1974 | Foulds ........................ | 224/418 |
| 6,371,233 | B2 * | 4/2002 | Ishii ............................. | 180/182 |
| 6,840,344 | B2 * | 1/2005 | Galbraith et al. ............ | 180/219 |
| 7,275,787 | B1 * | 10/2007 | Grove ..................... | 297/215.12 |
| 7,520,359 | B2 * | 4/2009 | Iwanaga ..................... | 180/219 |
| 7,681,852 | B2 * | 3/2010 | Magee ..................... | 248/311.2 |
| 2003/0010556 | A1 | 1/2003 | Galbraith et al. | |
| 2005/0121952 | A1 * | 6/2005 | Hajduczyk ................. | 297/195.1 |
| 2014/0167387 | A1 * | 6/2014 | Komatsu et al. ............. | 280/288 |

FOREIGN PATENT DOCUMENTS

| | | |
|---|---|---|
| JP | 2004-182108 A | 7/2004 |
| JP | 2005-088798 A | 4/2005 |
| JP | 2009-214626 A | 9/2009 |

* cited by examiner

*Primary Examiner* — Philip Gabler
(74) *Attorney, Agent, or Firm* — Birch, Stewart, Kolasch & Birch, LLP

(57) ABSTRACT

A saddle-ride type vehicle that does not require dismounting of a handhold regardless of the presence or absence of a carrier member. A stay member includes an outer portion situated beyond a seat in the outward direction of the vehicle body. A recess dented upwardly is formed in an underside of the outer portion. Because the recess is formed in the underside of the outer portion, a pillion passenger can grasp the recess after a carrier member has been dismounted from the stay member. In short, the recess serves as a handhold. The stay member remains attached to a seat rail either when the carrier member is mounted or dismounted. This eliminates the need to detach the handhold regardless of the presence or absence of the carrier member.

18 Claims, 10 Drawing Sheets

# SADDLE-RIDE TYPE VEHICLE

CROSS-REFERENCE TO RELATED APPLICATIONS

The present application claims priority under 35 USC 119 to Japanese Patent Application No. 2012-125071 filed May 31, 2012 the entire contents of which are hereby incorporated by reference.

BACKGROUND OF THE INVENTION

1. Field of the Invention

The present invention relates to a saddle-ride type vehicle including a carrier member provided behind a pillion passenger sitting on a seat to put luggage on.

2. Description of Background Art

Saddle-ride type vehicles without a carrier member are often provided with a grab rail onto which a pillion passenger can hold during traveling.

On the other hand, it is known that the luggage-carrying ability is increased by mounting the carrier member to the rear of the vehicle.

If a mounted position of the grab rail to the vehicle body is close to a mounted position of the carrier member to the vehicle body, the grab rail is detached for mounting the carrier member. In the alternative, the carrier member may be detached for mounting the grab rail.

A saddle-ride type vehicle providing for the replacement of a carrier member and/or a grab rail is known. See, for example, JP-A No. 2009-214626 (FIG. 2, FIG. 4).

As shown in FIG. 2 of JP-A No. 2009-214626, a grab rail (80) (a number in parentheses indicates the reference numeral described in JP-A No. 2009-0214626, the same shall apply hereinafter) is provided in the rear of the saddle-ride type vehicle. Mounting stays (81L, 81R) are provided respectively on the right and left ends of the grab rail (80).

As shown in FIG. 4 of JP-A No. 2009-214626, the mounting stay (81L) is placed on a frame bracket (32L) attached to the seat rail. A bracket (100L) is placed on the mounting stay (81L) and fastened with a bolt so that the mounting stay (81L) is joined to the seat rail. In short, the grab rail (80) is joined to the vehicle body.

Meanwhile, the mounted part is not limited to the grab rail (80), and may be a luggage carrier. Seem lines 4 to 6 of paragraph [0073] of JP-A No. 2009-214626.

Assuming that, in FIG. 2 of JP-A No. 2009-214626, a carrier member is supported by the vehicle body. In this case, the carrier member includes the mounting stays (81L, 81R) as in the case of the grab rail (80) and the mounting stays (81L, 81R) are fixed to the seat rail (31) with bolts.

To put the grab rail (80) to use, the bolt is removed to detach the carrier member from the seat rail (31). Then, the grab rail (80) is mounted to the seat rail (31).

The absolute necessity to detach and re-attach the grab rail (80) increases the number of processes of remodeling, resulting in an inconvenience. In addition, cautions should be exercised not to lose the detached grab rail (80). Furthermore, the grab rail (80) and the carrier member are required to be individually prepared, resulting in an increase in component count.

However, considering the convenience of the pillion passenger, structure eliminating the necessity to detach the grab rail (hereinafter referred to as a handhold) is desired.

SUMMARY AND OBJECTS OF THE INVENTION

An object of an embodiment of the present invention is to provide a saddle-ride type vehicle without the need to detach the handhold regardless of the presence or absence of the carrier member.

According to an embodiment of the present invention, a saddle-ride type vehicle includes a seat mounted on top of a vehicle body in a rear portion of a body frame in order for a pillion passenger to sit on the seat. A stay member is connected to the body frame under the seat, and also extends beyond the seat in an outward direction of the vehicle body. A carrier member is supported by the stay member to carry luggage wherein the stay member includes an outer portion situated beyond the seat in the outward direction of the vehicle body in plan view. A recess dented upward is formed in an underside of the outer portion.

According to an embodiment of the present invention, the stay member is of steel forging extending horizontally, and is placed between the seat and a rear cowl covering a side of the rear portion of the body frame.

According to an embodiment of the present invention, the outer portion of the stay member includes a thicker portion having a thickness greater than that of a general portion of the stay member. A pair of carrier support bosses is provided that project in an upward direction of the vehicle body to support the carrier member on the thicker portion. The recess is placed between the carrier support bosses.

According to an embodiment of the present invention, under the seat, a first rib is integrally formed on the stay member, and projects in the upward direction of the vehicle body beyond a lower end of a vehicle-width-direction side of the seat while extending along an extending direction of the body frame.

According to an embodiment of the present invention, a pair of body connecting bosses is attached to the body frame with a pair of bolts with a second rib extending in a vehicle longitudinal direction on an inward side of the first rib in a vehicle-width direction to connect the pair of body connecting bosses to each other are provided on an inner portion of the stay member.

According to an embodiment of the present invention, the stay member is placed to be inclined downwardly toward the front of the vehicle body with respect to a horizontal direction. A drain hole is placed inward of the first rib in the vehicle-width direction to discharge water in a front portion of the stay member.

According to an embodiment of the present invention, the carrier member includes a horizontally extending portion connected to the stay member and having a predetermined width in the vehicle-width direction, and a vertically extending portion extending from the horizontally extending portion in a downward direction of the vehicle body. The outer portion of the stay member extends to make contact with an inner face of the vertically extending portion.

According to an embodiment of the present invention, the stay member includes the outer portion situated more toward the outside of the vehicle body than the seat in plan view with the recess being formed in the underside of the outer portion.

Since the recess is formed in the underside of the outer portion of the stay member, this makes it possible for the pillion passenger to grasp the recess after the carrier member has been dismounted from the stay member. More specifically, the recess of the stay member results in the handhold. The stay member remains attached to the body frame either when the carrier member is mounted or dismounted. This eliminates the need to detach the handhold regardless of the presence or absence of the carrier member. Accordingly, a saddle-ride type vehicle not requiring removal of the handhold regardless of the presence or absence of the carrier member is provided.

In addition, because the recess is simply formed in the underside of the outer portion of the stay member, the need to mount an extra member used for the handhold on the vehicle body is eliminated, thus minimizing the increase in the weight of the vehicle body.

Further, by forming the recess in the underside of the outer portion of the stay member, the recess is hidden when viewed from above the stay member. Because of this, the appearance quality of the stay member can be improved.

According to an embodiment of the present invention, the stay member is of steel forging extending horizontally, and is placed between the seat and the rear cowl.

Since the horizontally extending stay member is placed between the seat and the rear cowl, the seat can be placed near the rear cowl, thus reducing the height of the seat to a minimum In addition, since the placement of the seat in a position close to the rear cowl is made possible, the clearance between the seat and the rear cowl is reduced to make it difficult for water to flow into the inside of the vehicle body. In consequence, a saddle-ride type vehicle that has a seat reduced in height to minimum and makes it hard for water to flow into the inside of the vehicle body is provided.

Further, the stay member is of steel forging. This facilitates mass production as compared with the case of manufacturing using casting or machining.

According to an embodiment of the present invention, the thicker portion is provided in the outer portion of the stay member. A pair of the carrier support bosses is provided on the thicker portion. Then, the recess is placed between the carrier support bosses.

By forming the recess in the thicker portion of the stay member, an excess thickness can be ensured adequately even when the recess is provided in the stay member. The adequate ensuring of the excessive thickness enables to form the handhold and also to minimize the reduction in strength of the stay member caused by providing the recess.

According to an embodiment of the present invention, the first rib of the stay member projects in the upward direction of the vehicle body beyond the lower end of the vehicle-width-direction side of the seat.

More specifically, because the lower end of the vehicle-width-direction side of the seat is positioned lower than the top end of the first rib, this makes it possible to stop the inflow of water from the outside of the vehicle body at the lower end of the vehicle-width-direction side of the seat Also, even if the water flows through underneath the lower end of the vehicle-width-direction side of the seat, the entry of water into the vehicle body can be stopped at the first rib. Accordingly, the flow of water into the vehicle body can be prevented with reliability.

According to an embodiment of the present invention, the second rib, which connects between a pair of the body connecting bosses on the inward side of the first rib in the vehicle-width direction, is provided on the inner portion of the stay member.

Because the second rib extends to connect between a pair of body connecting bosses, even if water flows over the first rib, the second rib can obstruct the flow of water into the vehicle body. The second rib prevents water from flowing into the vehicle body with further reliability.

According to an embodiment of the present invention, the stay member is placed to be inclined downwardly toward the front of the vehicle body. The drain hole, which is placed inward of the first rib in the vehicle-width direction to discharge water, is provided in the front portion of the stay member.

By the downward inclination of the stay member toward the front of the vehicle body and the provision of the drain hole in the front portion of the stay member, even if water entering from the outside of the vehicle body flows over the first rib, the water flows along the inclination in the forward and downward direction to be discharged from the drain hole. As a result, the water flowing over the first rib can be easily discharged.

According to an embodiment of the present invention, the carrier member includes the horizontally extending portion connected to the stay member and the vertically extending portion extending from the horizontally extending portion in the downward direction of the vehicle body. The outer portion of the stay member extends to make contact with the inner face of the vertically extending portion.

The outer portion of the stay member extends to make contact with the inner face of the vertically extending portion of the carrier member. With this, an increase in length of the stay member in the vehicle-width direction is made possible. Because the long stay member supports the horizontally extending portion of the carrier member, the carrier member can be satisfactorily supported.

In addition, because the outer portion of the stay member extends to make contact with the inner face of the vertically extending portion of the carrier member, the recess formed in the outer portion is placed more outward in the vehicle body. More specifically, the pillion passenger can easily grasp the recess. Accordingly, the carrier member can be favorably supported and the recess can be easily grasped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments according to the present invention will be described below with reference to the accompanying drawings. The drawings shall be viewed in a direction of a reference sign. Front, rear, left, right, up and down used in the following description are defined relative to the occupant sitting on the occupant seat.

A saddle-ride type vehicle according to the present invention is described with reference to the drawings.

Figure 1:
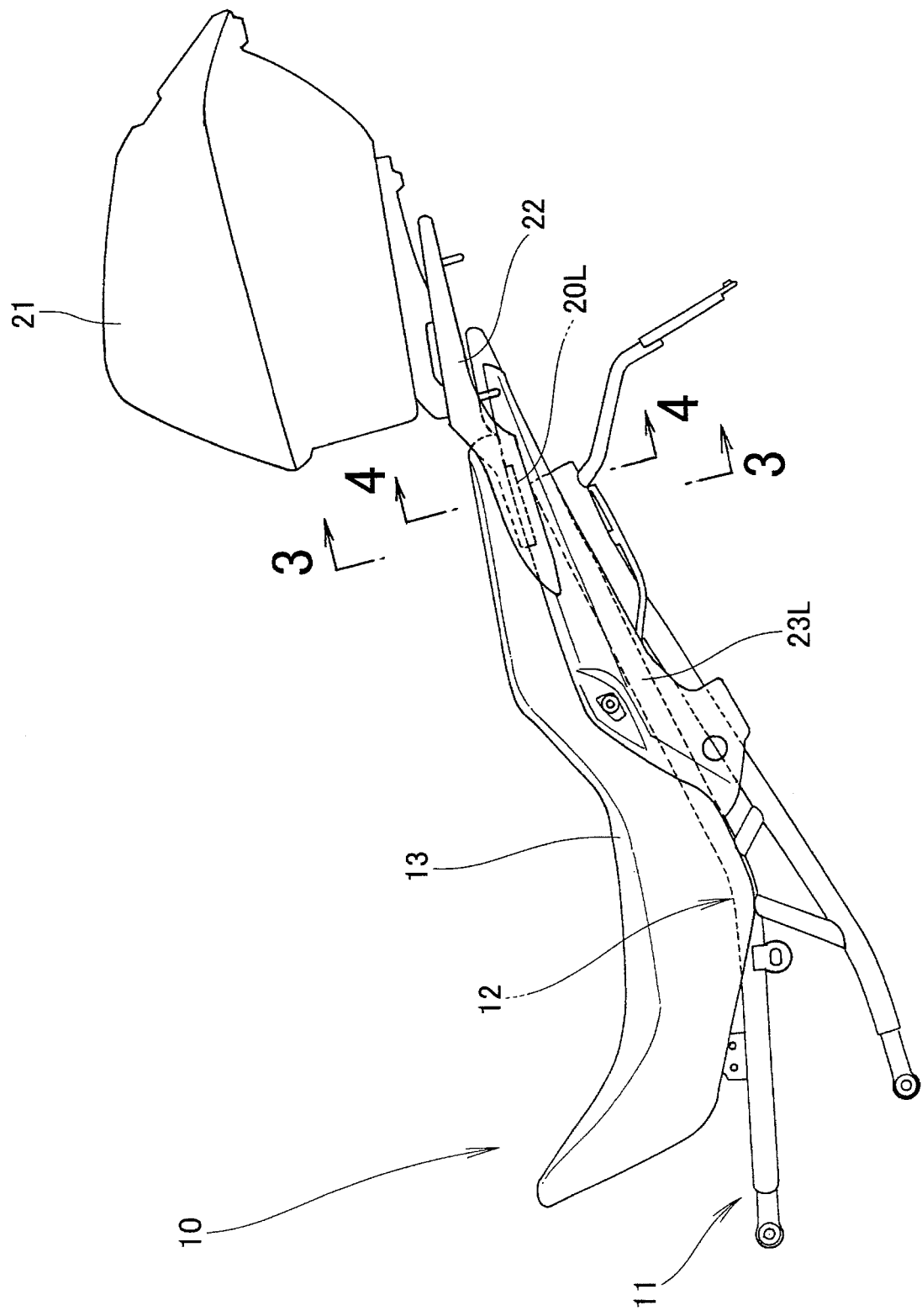
FIG. 1 is a left side view of a body rear section of a saddle-ride type vehicle according to the present invention.

As shown in FIG. 1, a body rear section 10 of the saddle-ride type vehicle includes a rear portion 12 of a body frame 11 (described in detail later) with a seat 13 mounted on the top of the vehicle body in the rear portion 12 of the body frame 11 in order for a rider and a pillion passenger to sit on the seat 13. A stay member 20L ("L" is a suffix indicating the left, the same shall apply hereinafter) is connected to the body frame 11 under the seat 13 and also extends beyond the seat 13 toward the left of the vehicle body. A carrier member 22 (described in detail later) is supported by the stay member 20L (described in detail later) to support a luggage box 21. A rear cowl 23L (described in detail later) is supported by the rear portion 12 of the body frame 11 below the seat 13 to cover the left of the rear portion 12 of the body frame 11.

The seat 13 is designed as a tandem seat into which a rider seat and a pillion are integrally formed in the embodiment, but may be designed as a rider seat and a pillion being individually formed on the rear portion 12 of the body frame 11.

In addition, the luggage box 21 is attached to the carrier member 22, but luggage may be placed directly on the carrier member 22.

A structure of the rear portion 12 of the body frame 11 is described with reference to FIG. 2.

Figure 2:
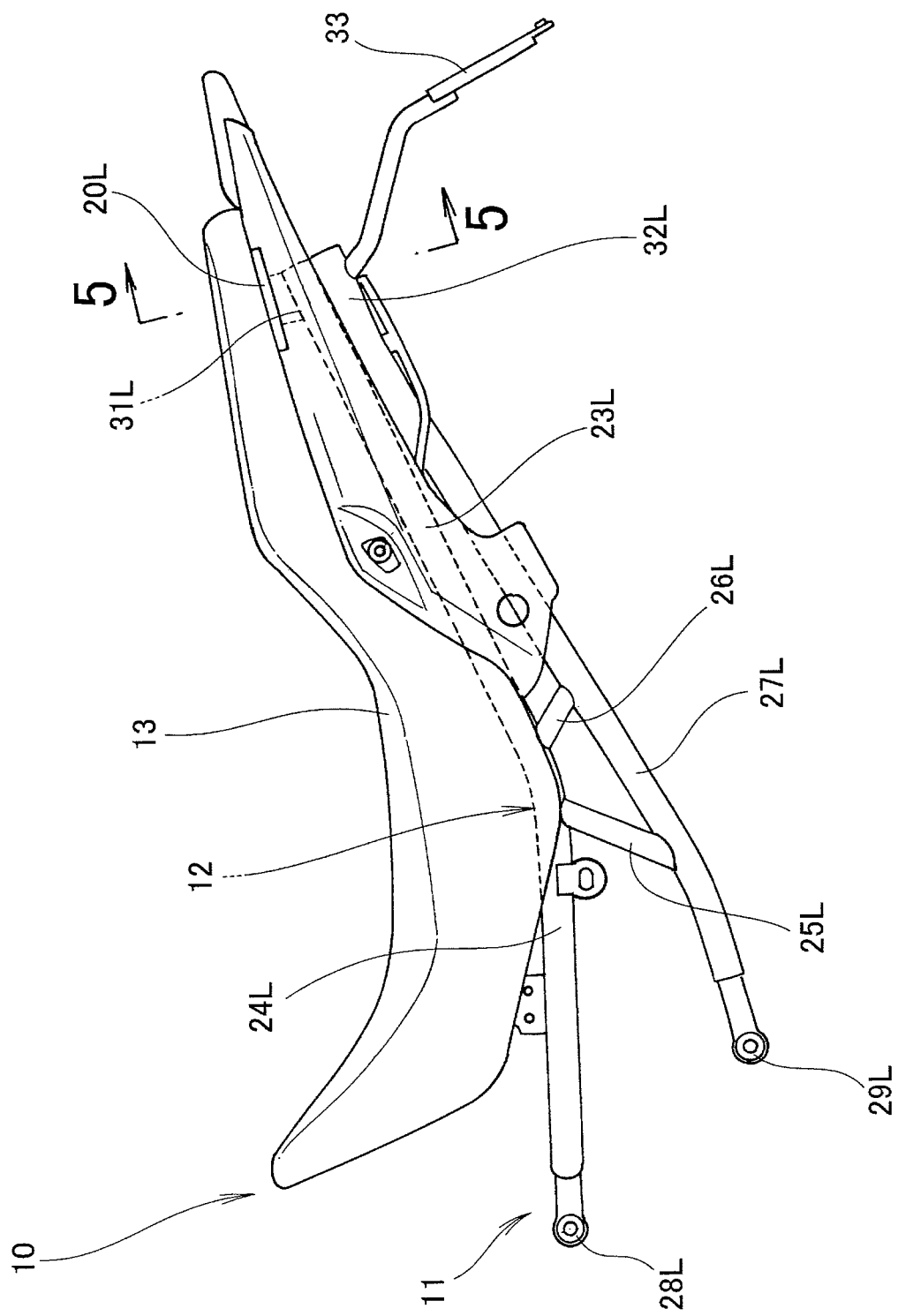
FIG. 2 is a left side view of the body rear section with a luggage box removed.

As shown in FIG. 2, the rear portion 12 of the body frame 11 has a seat rail 24L extending toward the rear of the vehicle body and then extending upwardly toward the rear of the vehicle body to support the seat 13. A sub-frame 27L is connected to the seat rail 24L via two coupler members 25L, 26L and extends upwardly toward the rear of the vehicle body.

The stay member 20L is supported on a rear end 31L of the seat rail 24L. The stay member 20L is placed to be inclined downwardly toward the front of the vehicle body with respect to the horizontal direction.

A front end 28L of the seat rail 24L is a part connected to a main frame.

A front end 29L of the sub-frame 27L is a part connected to the main frame or a pivot frame.

In addition, the rear end 31L of the seat rail 24L and a rear end 32L of the sub-frame 27L are coupled together. A rear fender stay 33 is mounted on the rear end 32L of the sub-frame 27L.

A structure of the stay member 20L is hereinafter described with reference to FIG. 3.

Figure 3:
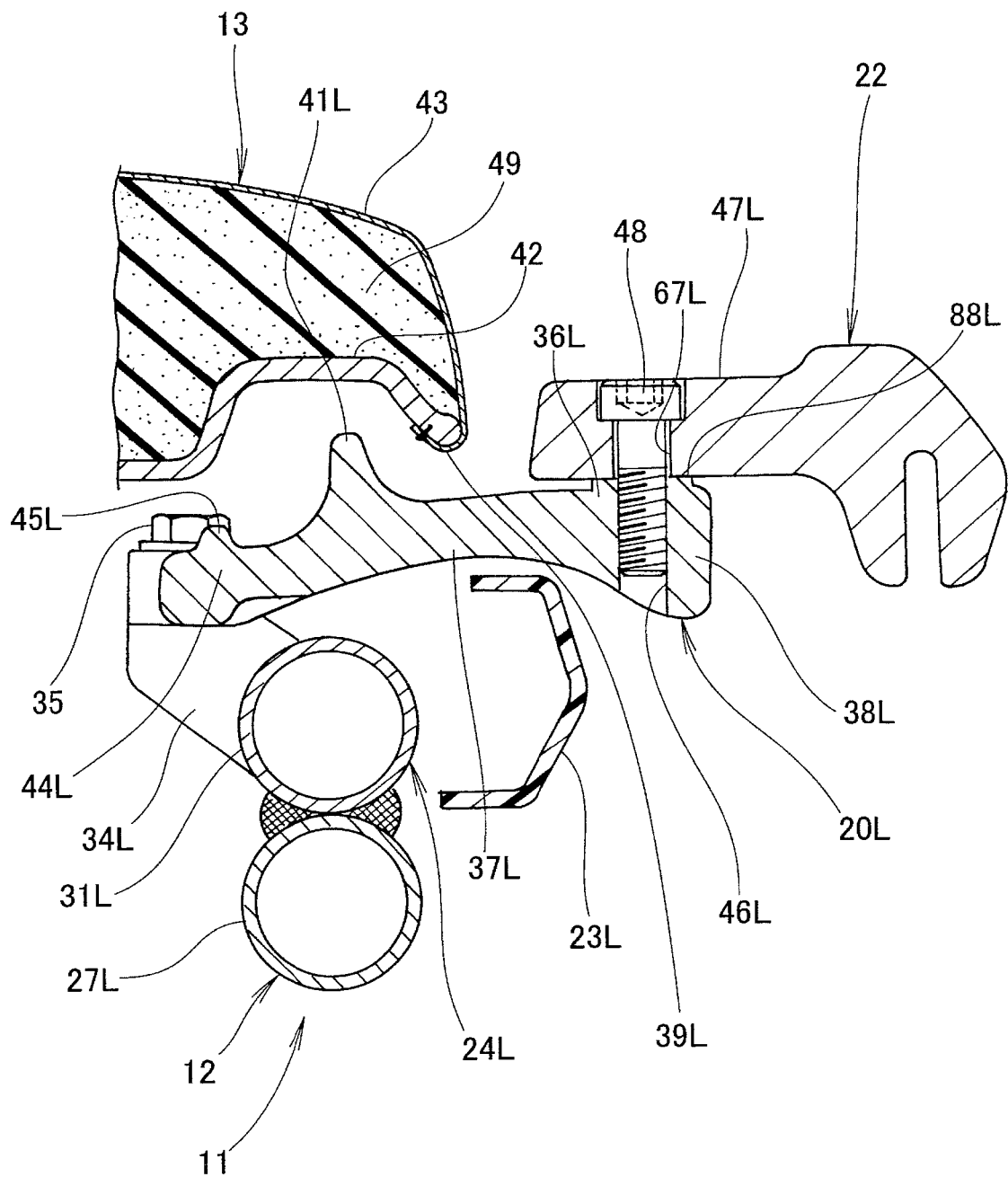
FIG. 3 is a sectional view taken along line 3-3 in FIG. 1.

As shown in FIG. 3, the stay member 20L is attached, with a bolt 35, to a rear stay rest 34L provided at the rear end 31L of the seat rail 24L. The seat rail 24L is provided with a front stay rest in addition to the rear stay rest 34L. The front stay rest will be described later.

In addition, the stay member 20L includes an outer portion 36L located more toward the left of the vehicle body than the seat 13. The outer portion 36L is provided with a thicker portion 38L greater than the thickness of a general portion 37L of the stay member 20L.

Furthermore, a screw hole 46L bored in the vertical direction of the vehicle body is formed through the outer portion 36L of the stay member 20L. A mount 47L of the carrier member 22 is placed on the outer portion 36L, and then a bolt 48 is tightened in the screw hole 46L, so that the carrier member 22 is joined to the stay member 20L.

Under the seat 13, a first rib 41L is integrally formed on the stay member 20L, and projects in the upward direction of the vehicle body beyond a lower end 39L of a vehicle-width-direction side of the seat 13. The lower end 39L of the vehicle-width-direction side of the seat 13 is a lower end of a seat skin 43 mounted on a left end of a seat bottom plate 42.

Further, a second rib 45L is provided on an inner portion 44L of the stay member 20L, and projects upward on the inward side of the first rib 41L in the vehicle-width direction.

A structure of a handhold provided on the outer portion 36L of the stay member 20L is described with reference to FIG. 4.

Figure 4:
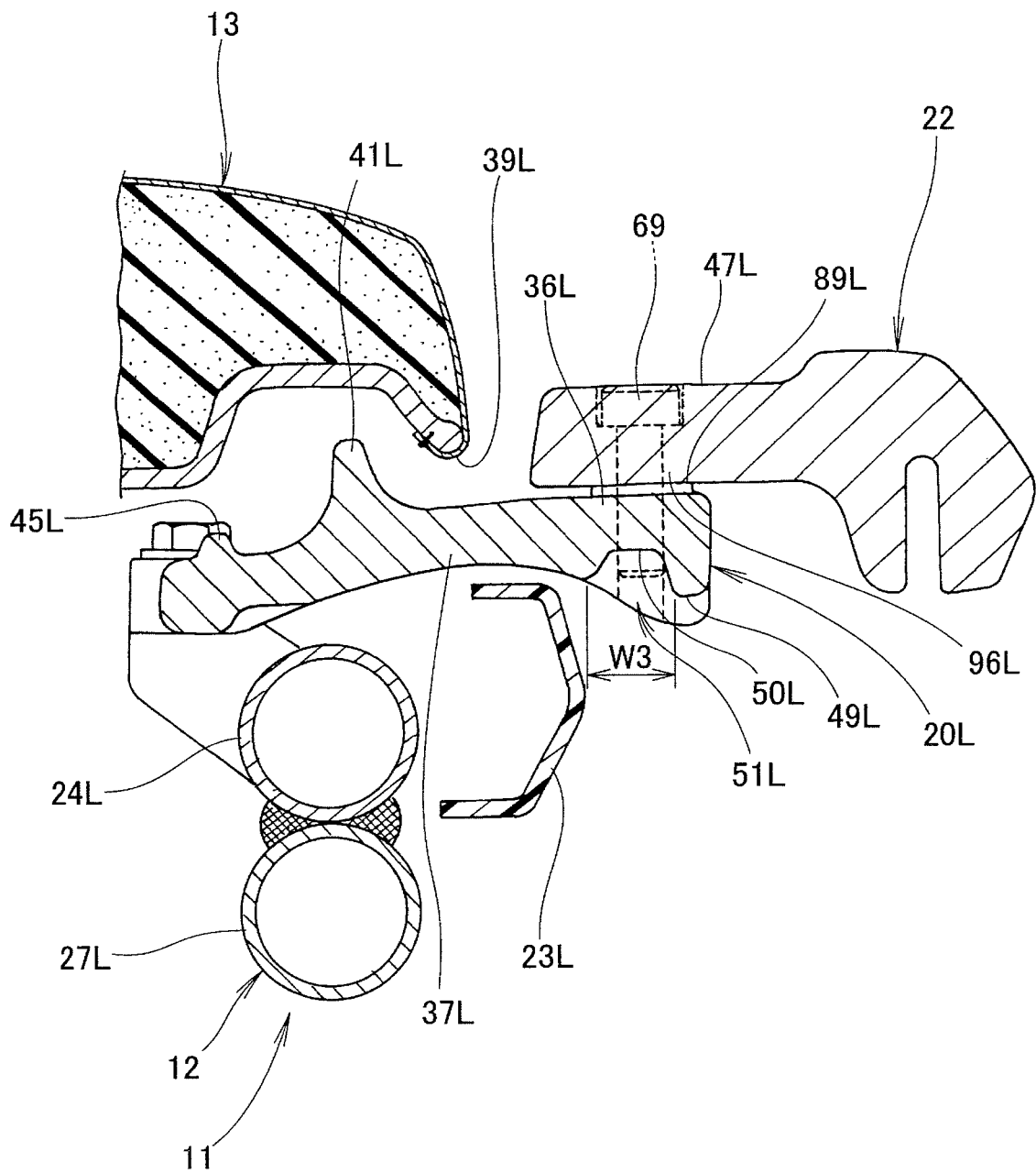
FIG. 4 is a sectional view taken along line 4-4 in FIG. 1.

As shown in FIG. 4, a recess 50L dented upward is formed in an underside 49L of the outer portion 36L. The pillion passenger can engage his fingers with the recess 50L.

Operation for the pillion passenger to engage his fingers with the recess 50L is described with reference to FIG. 5.

Figure 5:
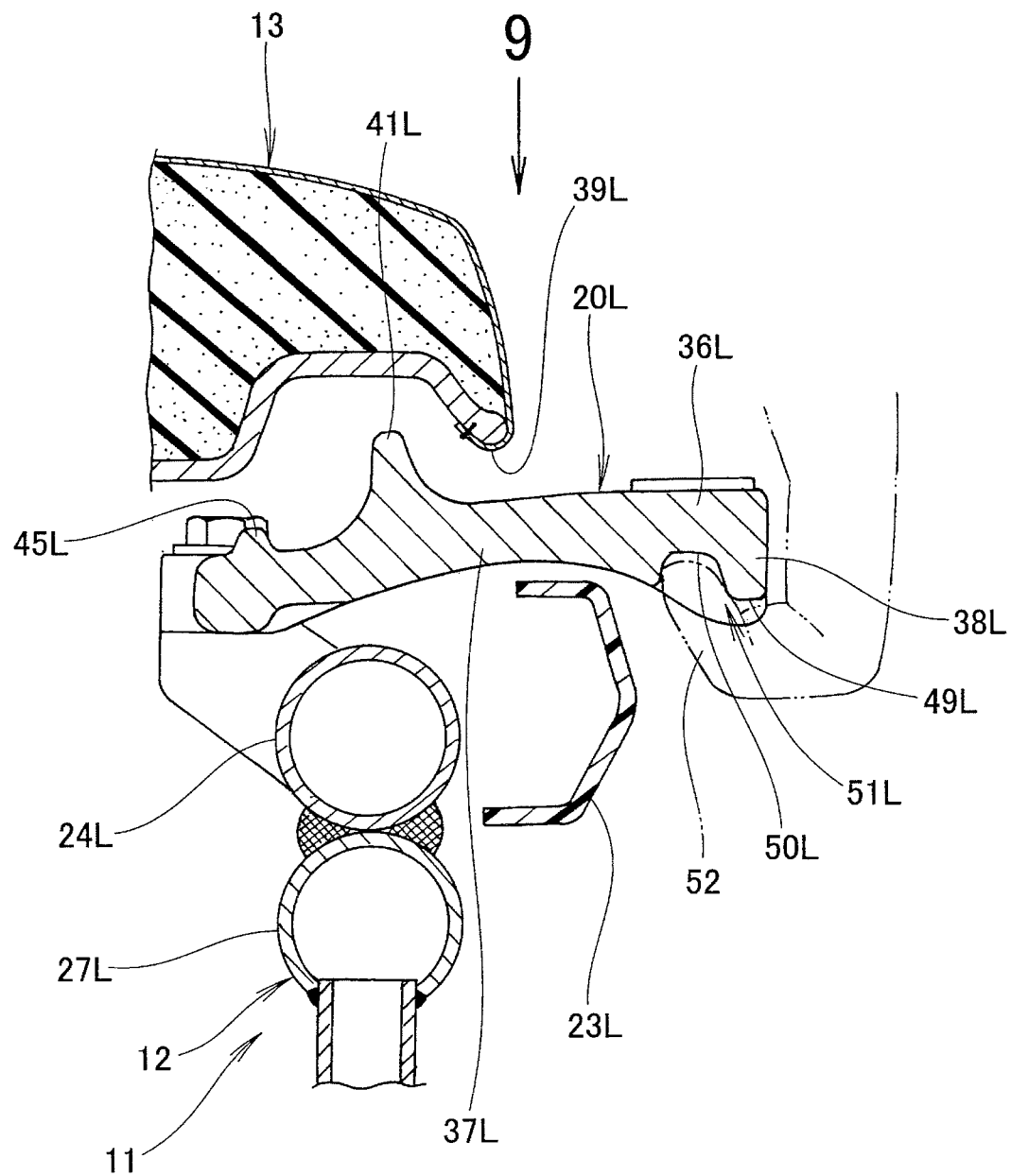
FIG. 5 is a sectional view taken along line 5-5 in FIG. 2.

As shown in FIG. 5, the carrier member (sign 22 in FIG. 4) is dismounted from the stay member 20L, so that the pillion passenger can engage fingers 52 with the recess 50L of the stay member 20L.

In addition, the stay member 20L is of steel forging extending horizontally, and is placed between the seat 13 and the rear cowl 23L.

A way to mount the stay member 20L is described with reference to FIG. 6.

Figure 6:
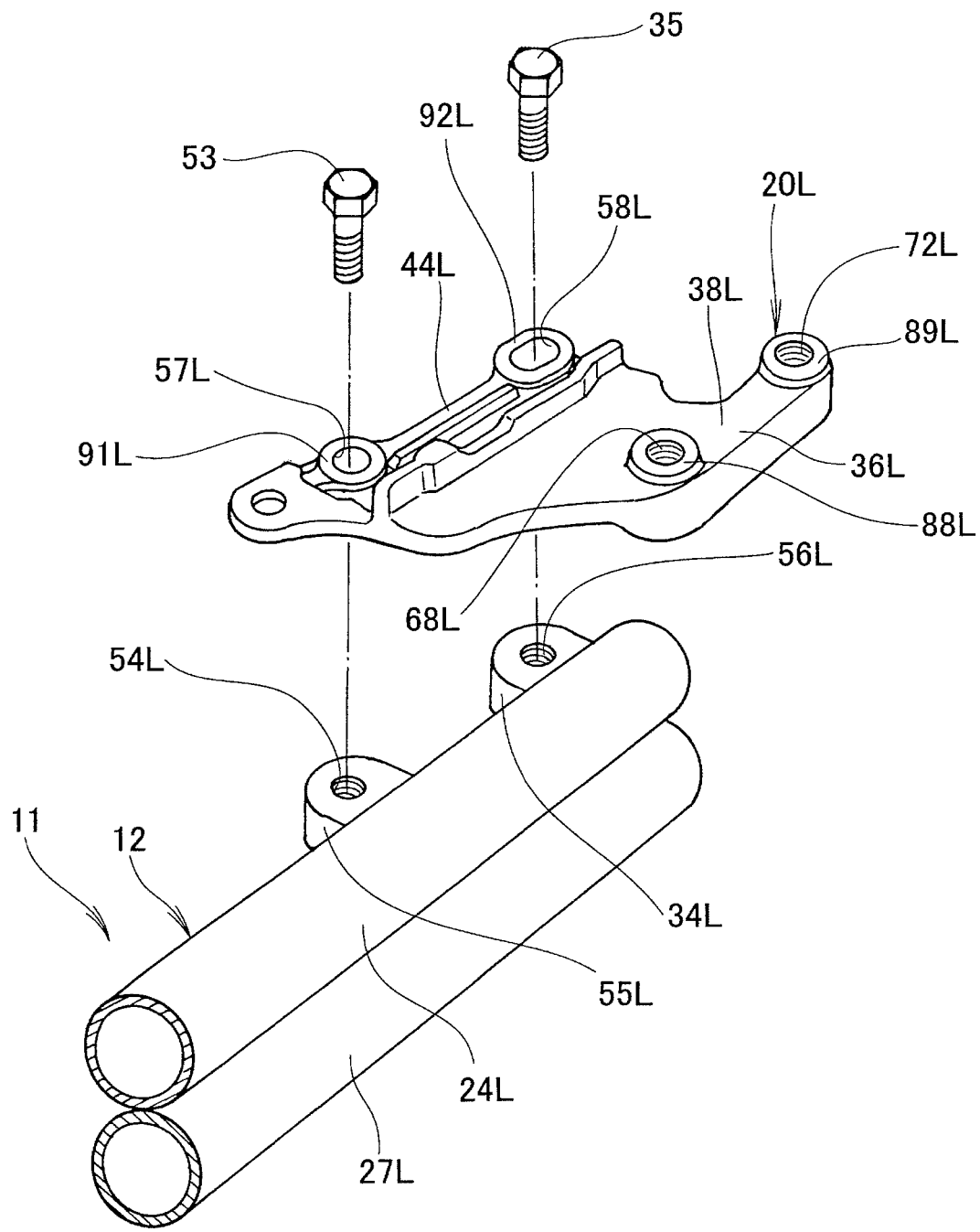
FIG. 6 is an exploded perspective view illustrating how to mount a stay member.

In FIG. 6, a bolt 53 is inserted through a hole 57L bored in a front portion of the inner portion 44L of the stay member 20L. The bolt 35 is inserted through a hole 58L bored in a rear portion of the inner portion 44L.

Then, the bolt 53 is screwed into a screw hole 54L of a front stay rest 55L of the seat rail 24L. The bolt 35 is mounted in the screw hole 56L of the rear stay rest 34L of the seat rail 24L. As a result, the stay member 20L is mounted to the seat rail 24L.

A front carrier support boss 88L is provided on a front portion of the thicker portion 38L of the stay member 20L, while a rear carrier support boss 89L is provided on a rear portion of the thicker portion 38L. A pair of the carrier support bosses 88L, 89L each project in the upward direction of the vehicle body to support a carrier member 22 as illustrated in FIG. 3.

A front body connecting boss 91L having the hole 57L is provided on the front portion of the inner portion 44L of the stay member 20L. In addition, a rear body connecting boss 92L having the hole 58L is provided on the rear portion of the inner portion 44L. A pair of the body connecting bosses 91L, 92L each project in the upward direction of the vehicle body.

A way to mount the rear cowl 23L and the carrier member 22 is described with reference to FIG. 7.

Figure 7:
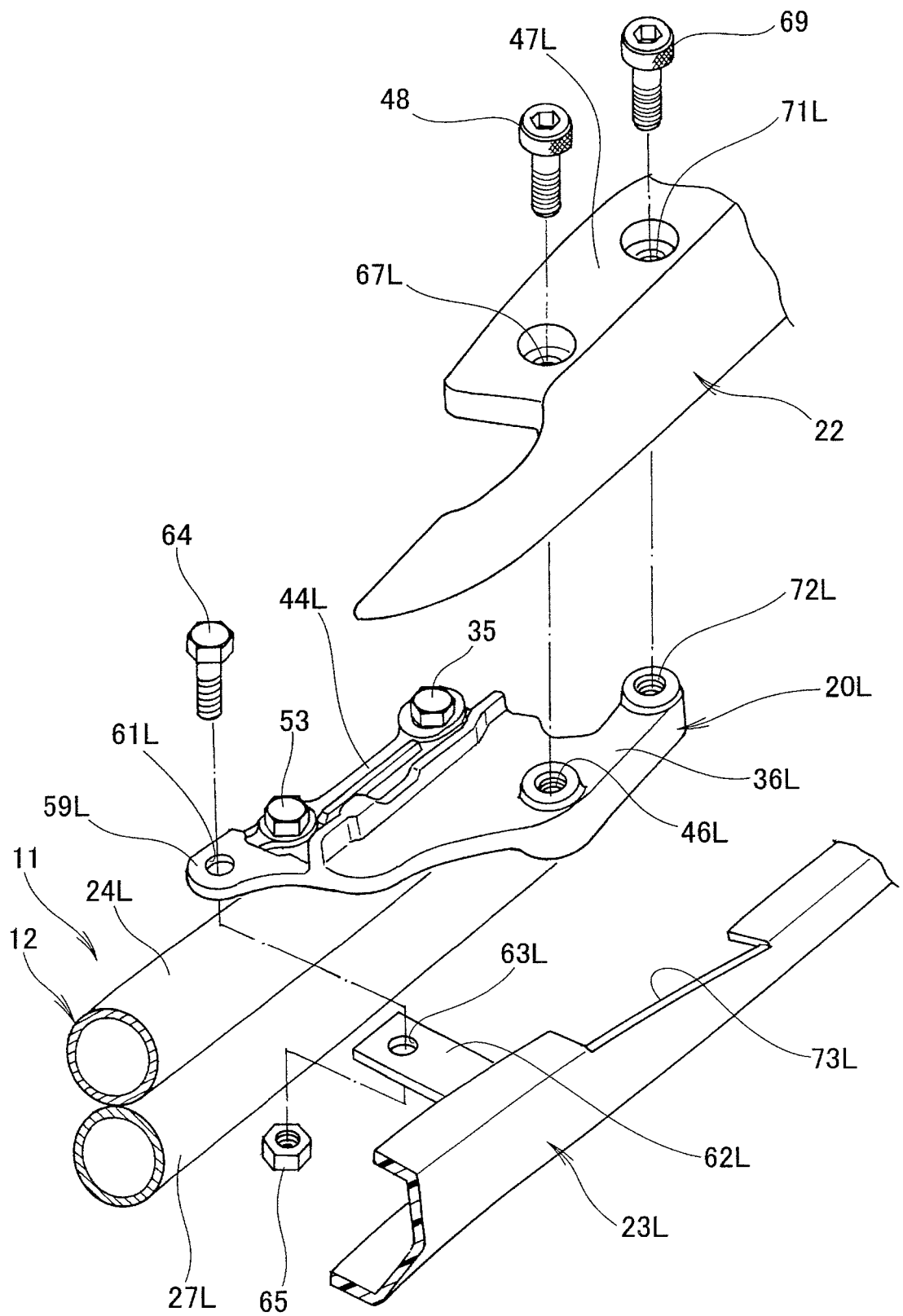
FIG. 7 is an exploded perspective view illustrating how to mount a rear cowl and a carrier member.

In FIG. 7, a bolt 64 is inserted through a hole 61L bored in a front edge flange 59L of the stay member 20L and a hole 63L bored in an inner flange 62L of the rear cowl 23L. The bolt 64 and the nut 65 are tighten together in order to mount the rear cowl 23L to the stay member 20L.

In addition, a bolt 48 is inserted through a hole 67L bored in a front portion of the mount 47L of the carrier member 22. A bolt 69 is inserted through a hole 71L bored in a rear portion of the mount 47L.

Then, the bolt 48 is tightened into a screw hole 46L formed in a front portion of the outer portion 36L of the stay member 20L. The bolt 69 is tightened into a screw hole 72L formed in a rear portion of the outer portion 36L. As a result, the carrier member 22 is mounted on the stay member 20L.

A way to mount the seat 13 and the luggage box 21 is described with reference to FIG. 8.

Figure 8:
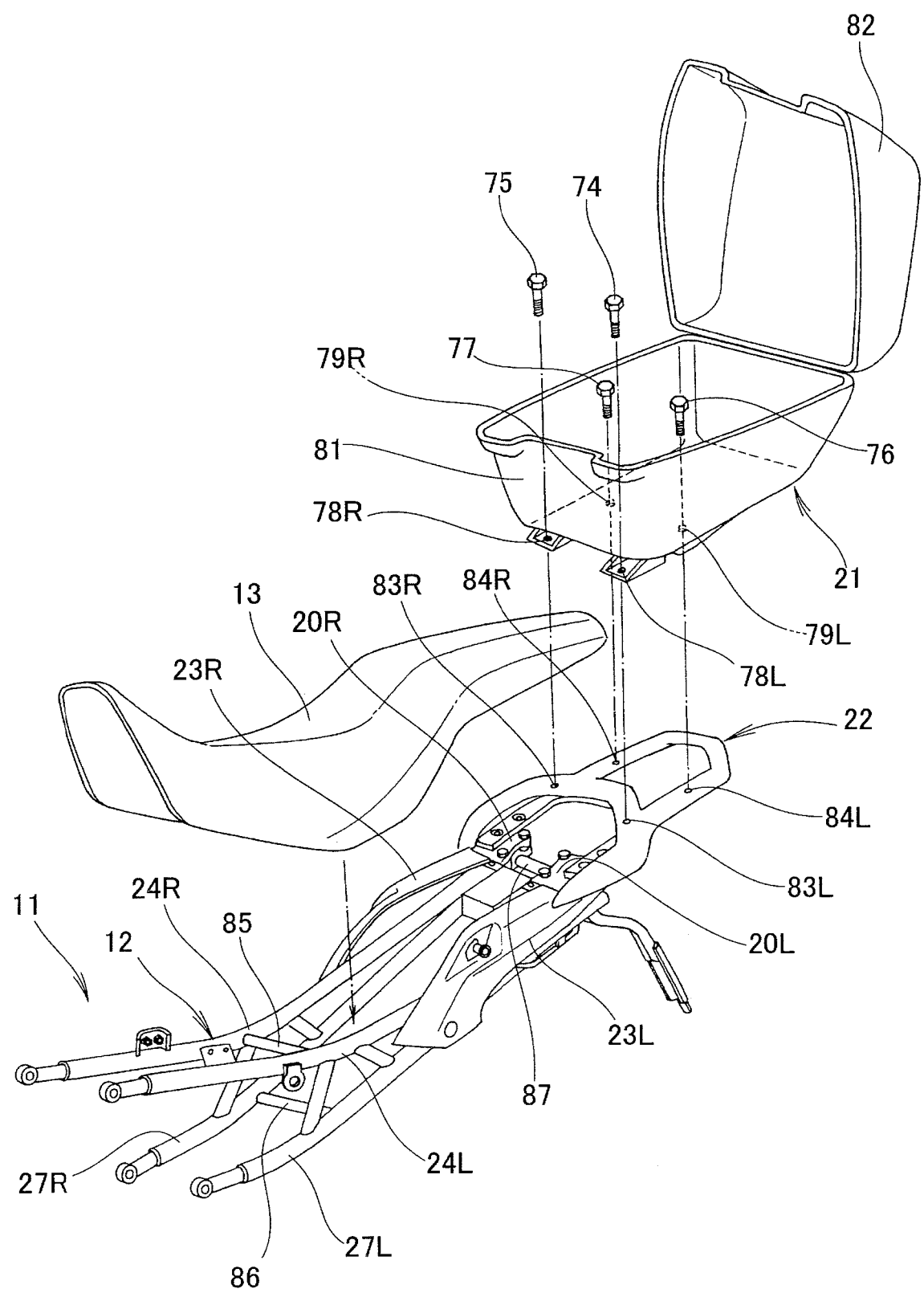
FIG. 8 is an exploded perspective view illustrating how to mount a seat and a luggage box.

In FIG. 8, the seat 13 is mounted on a rear portion 12 of the body frame 11.

Then, a lid 82 of the luggage box 21 is opened, and then bolts 74 to 77 are inserted through holes 78L, 78R, 79L, 79R formed in a case 81 of the luggage box 21. The bolts 74 to 77 are tightened into screw holes 83L, 83R, 84L, 84R of the carrier member 22 in order to mount the luggage box 21 on the carrier member 22.

Next, a short description will be given of the structure of the rear portion 12 of the body frame 11.

The rear portion 12 of the body frame 11 includes the seat mil 24L, the sub-frame 27L, a seat rail 24R ("R" is a suffix indicating the right, the same shall apply hereinafter), a sub-frame 27R, a front upper cross member 85 connecting the front portion of the seat rail 24L to a front portion of the seat rail 24R, a front lower cross member 86 connecting a front portion of sub-frame 27L to a front portion of the sub-frame 27R, and a rear cross member 87 connecting a rear end of the sub-frame 27L and a rear end of the sub-frame 27R.

A detail structure of the stay member 20L is described with reference to FIG. 9. The seat 13 is shown by a phantom line.

Figure 9:
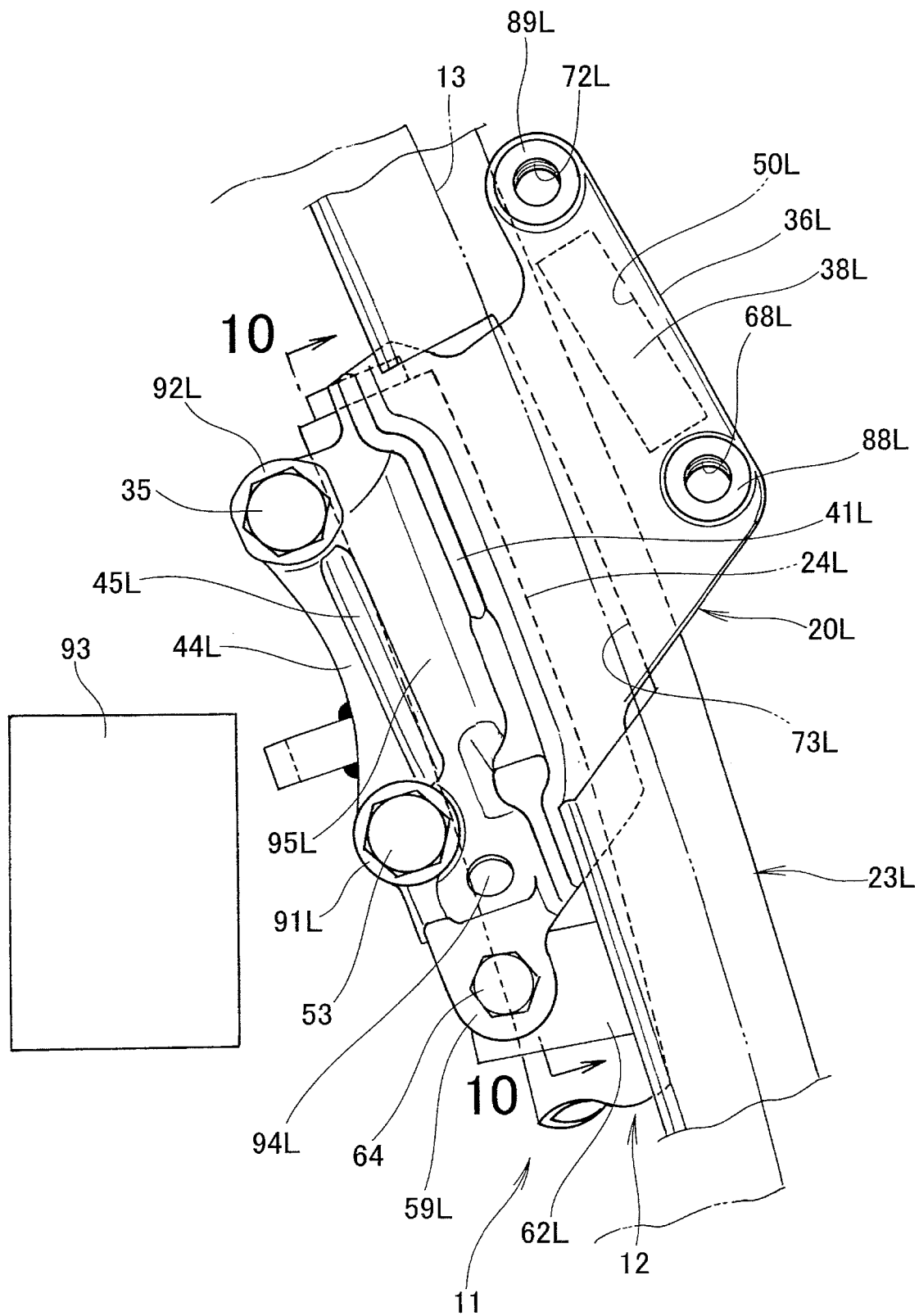
FIG. 9 is a view on arrow 9 in FIG. 5.

In FIG. 9, the outer portion 36L is situated more toward the left of the vehicle body than the seat 13 in plan view.

The recess 50L shown by a hidden outline is placed between the front carrier support boss 88L and the rear carrier support boss 89L.

The first rib 41L and the second rib 45L extend along the extending direction of the seat rail 24L. A flat-shaped valley 95L is provided between the first rib 41L and the second rib 45L. The first rib 41L and the second rib 45L are able to prevent inflow of water from the outside of the vehicle body from reaching electrical components 93.

In addition, a drain hole 94L (described later in detail), which is placed inward of the first rib 41L in the vehicle-width direction to discharge water, is provided in the front portion of the stay member 20L.

The operation of the drain hole 94L is described with reference to FIG. 10.

Figure 10:
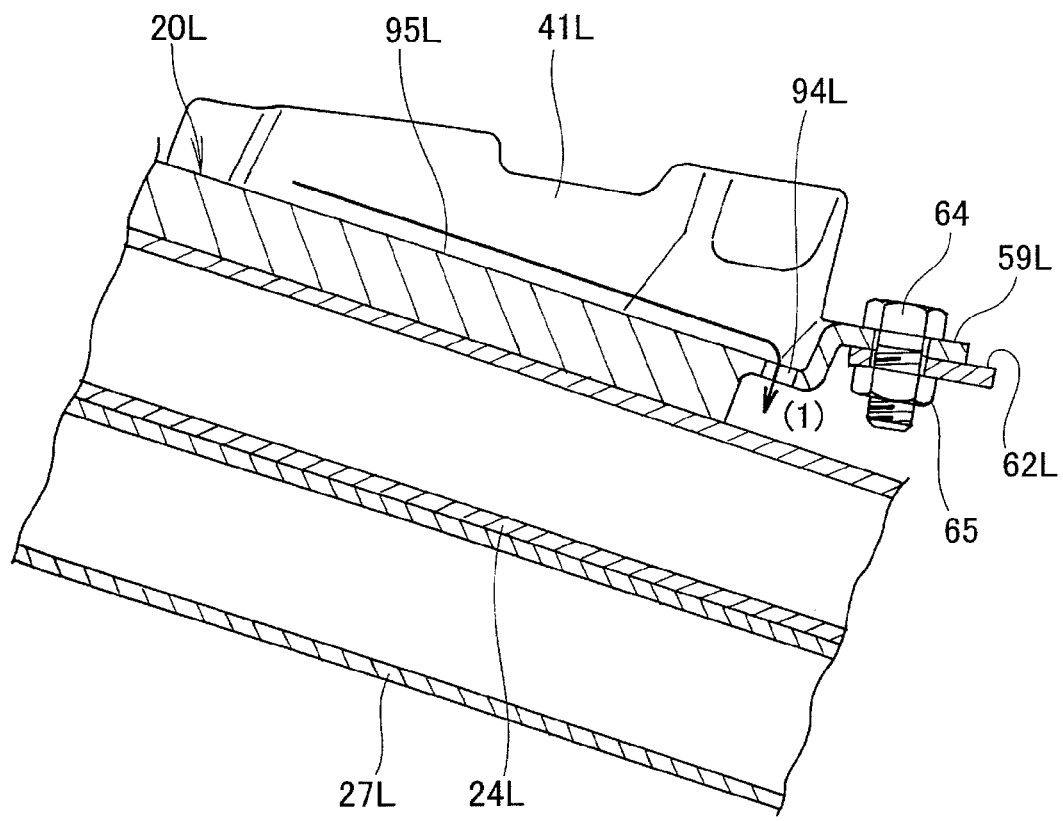
FIG. 10 is a sectional view taken along line 10-10 in FIG. 9.

As shown in FIG. 10, since the stay member 20L is placed to be inclined downwardly toward the front of the vehicle body with respect to the horizontal direction, the water flowing into the valley 95L of the stay member 20L can be discharged from the drain hole 94L as indicated by arrow (1).

The outer portion 36L of the stay member 20L, described up to this point, is designed to support only the inner portion 96L of the carrier member 22 as shown in FIG. 4. Meanwhile, a more preferable structure is a structure capable of more effectively supporting the carrier member 22. The recess 50L is more preferably placed in a position to give greater ease in grasping. For this purpose, the following describes an example of more effectively supporting the carrier member and placing the recess in a position to give greater ease in grasping.

Figure 11:
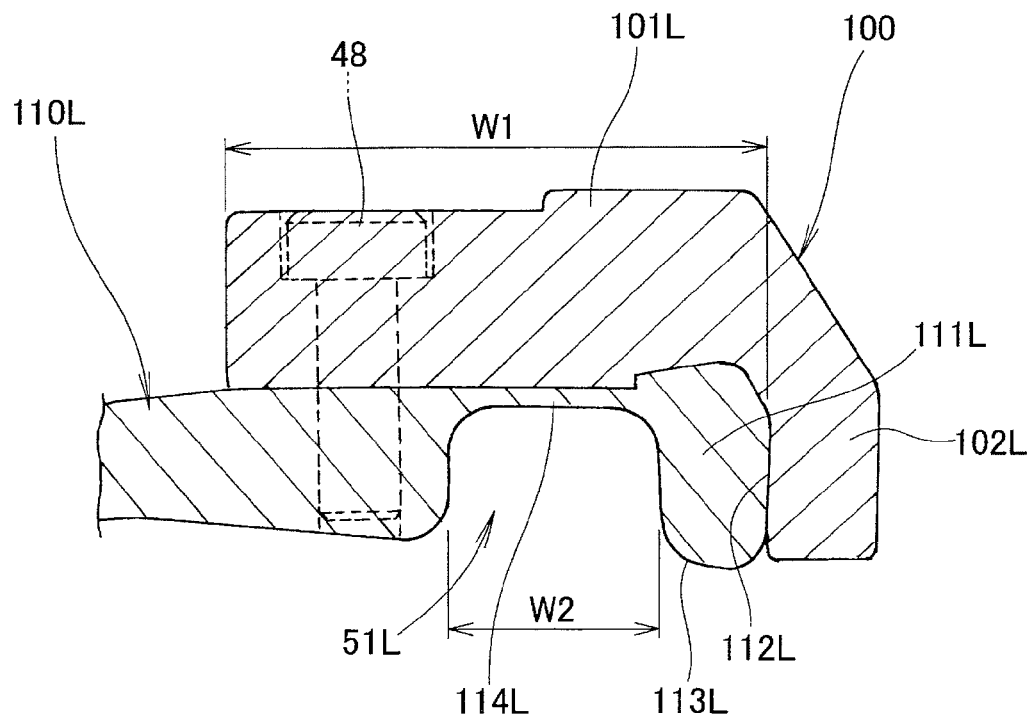
FIG. 11 is a view showing an example of changing of FIG. 4.

In FIG. 11, above-described reference numerals are also used for a common structure with FIG. 4, and details are not repeated. A major change is to further extend the outer portion of the stay member toward the left of the vehicle body.

A carrier member 100 includes a horizontally extending portion 101L connected to a stay member 110L and having a predetermined width W1 in the vehicle-width direction. A vertically extending portion 102L extends from the horizontally extending portion 101L in the downward direction of the vehicle body.

On the other hand, an outer portion 111L of the stay member 110L extends to make contact with an inner face 112L of the vertically extending portion 102L. More specifically, the horizontally extending portion 101L of the carrier member 100 is supported by the outer portion 111L of the stay member 110L.

A recess 114L having a width W2 is formed in an underside 113L of the outer portion 111L. The width W2 of the recess 114L is greater than the width W3 (see FIG. 4) of the recess 50L, so that the recess 114L is grasped easily by the pillion passenger.

Functional effects of the above-mentioned saddle-ride type vehicle will be described below.

As shown in FIG. 9, the stay member 20L includes the outer portion 36L situated more toward the outside of the vehicle body than the seat 13 in a plan view. As shown in FIG. 5, the recess 50L is formed in the underside 49L of the outer portion 36L.

Since the recess 50L is formed in the underside 49L of the outer portion 36L of the stay member 20L, this makes it possible for the pillion passenger to grasp the recess 50L after the carrier member has been dismounted from the stay member 20L. More specifically, the recess 50L of the stay member 20L results in the handhold 51L. The stay member 20L remains attached to the body frame 11 either when the carrier member is mounted or dismounted. This eliminates the need to detach the handhold 51L regardless of the presence or absence of the carrier member. Accordingly, a saddle-ride type vehicle not requiring removal of the handhold 51L regardless of the presence or absence of the carrier member is provided.

In addition, with the structure shown in FIG. 5, because the recess 50L is simply formed in the underside 49L of the outer portion 36L of the stay member 20L, the need to mount an extra member used for the handhold on the vehicle body is eliminated. Thus, an increase in the weight of the vehicle body is minimized.

Further, with the structure shown in FIG. 9, by forming the recess 50L in the underside of the outer portion 36L of the stay member 20L, the recess 50L is hidden when viewed from above the stay member 20L. In view of this construction, the appearance quality of the stay member 20L can be improved.

With the structure shown in FIG. 5, the stay member 20L is of steel forging extending horizontally, and is placed between the seat 13 and the rear cowl 23L.

Since the horizontally extending stay member 20L is placed between the seat 13 and the rear cowl 23L, the seat 13 can be placed near the rear cowl 23L, thus reducing the height of the seat 13 to a minimum. In addition, since the placement of the seat 13 in a position close to the rear cowl 23L is made possible, the clearance between the seat 13 and the rear cowl 23L is reduced to make it difficult for water to flow into the inside of the vehicle body. In consequence, a saddle-ride type vehicle that has a seat 13 reduced in height to minimum and makes it hard for water to flow into the inside of the vehicle body is provided.

Further, with the structure shown in FIG. 5, the stay member 20L is of steel forging. This facilitates mass production as compared with the case of manufacturing using casting or machining.

As shown in FIG. 3, the thicker portion 38L is provided in the outer portion 36L of the stay member 20L. As shown in FIG. 9, a pair of the carrier support bosses 88L, 89L is provided on the thicker portion 38L. Then, the recess 50L is placed between the carrier support bosses 88L, 89L.

As shown in FIG. 5, by forming the recess 50L in the thicker portion 38L of the stay member 20L, an excess thickness can be ensured adequately even when the recess 50L is provided in the stay member 20L. The adequate ensuring of the excessive thickness enables to form the handhold 51L and also to minimize the reduction in strength of the stay member 20L caused by providing the recess 50L.

With the structure shown in FIG. 5, the first rib 41L of the stay member 20L projects in the upward direction of the vehicle body beyond the lower end 39L of the vehicle-width-direction side of the seat 13.

More specifically, because the lower end 39L of the vehicle-width-direction side of the seat 13 is positioned lower than the top end of the first rib 41L, this makes it possible to stop the inflow of water from the outside of the vehicle body at the lower end 39L of the vehicle-width-direction side of the seat 13. Also, even if the water flows through underneath the lower end 39L of the vehicle-width-direction side of the seat 13, the entry of water into the vehicle body can be stopped at the first rib 41L. Accordingly, the flow of water into the vehicle body can be prevented with reliability.

With the structure shown in FIG. 9, the second rib 45L, that connects between a pair of the body connecting bosses 91L, 92L on the inward side of the first rib 41L in the vehicle-width direction, is provided on the inner portion 44L of the stay member 20L.

Because the second rib 45L extends to connect between a pair of body connecting bosses 91L, 92L, even if water flows over the first rib 41L, the second rib 45L can obstruct the flow of water into the vehicle body. The second rib 45L prevents water from flowing into the vehicle body with further reliability.

As shown in FIG. 10, the stay member 20L is placed to be inclined downwardly toward the front of the vehicle body. As shown in FIG. 9, the drain hole 94L, which is placed inward of the first rib 41L in the vehicle-width direction to discharge water, is provided in the front portion of the stay member 20L.

In FIG. 10, by the downward inclination of the stay member 20L toward the bottom of the vehicle body and the provision of the drain hole 94L in the front portion of the stay member 20L, even if water entering from the outside of the vehicle body flows over the first rib 41L, the water flows along the inclination in the forward and downward direction as shown by arrow (1) to be discharged from the drain hole 94L. As a result, the water flowing over the first rib 41L can be easily discharged.

With the structure shown in FIG. 11, the carrier member 100 includes the horizontally extending portion 101L connected to the stay member 110L and the vertically extending portion 102L extending from the horizontally extending portion 101L in the downward direction of the vehicle body. The outer portion 111L of the stay member 110L extends to make contact with the inner face 112L of the vertically extending portion 102L.

The outer portion 111L of the stay member 110L extends to make contact with the inner face 112L of the vertically extending portion 102L of the carrier member 100. With this, an increase in length of the stay member 110L in the vehicle-width direction is made possible. Because the long stay member 110L supports the horizontally extending portion 101L of the carrier member 100, the carrier member 100 can be satisfactorily supported.

In addition, because the outer portion 111L of the stay member 110L extends to make contact with the inner face 112L of the vertically extending portion 102L of the carrier member 100, the recess 114L formed in the outer portion 111L is placed more outwardly in the vehicle body. More specifically, the pillion passenger can easily grasp the recess 114L. Accordingly, the carrier member 100 can be favorably supported and the recess 114L can be easily grasped.

In FIG. 9, the outer portion 36L of the stay member 20L is formed to extend in the leftward and rearward direction of the vehicle body, but, except this, the outer portion 36L may extend straight in the leftward direction of the vehicle body or may extend in the leftward and forward direction of the vehicle body.

The stay member according to the present invention is suitable for a saddle-ride type vehicle providing for attachment of a carrier member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle, comprising:
a seat mounted on top of a vehicle body in a rear portion of a body frame for a pillion passenger to sit on the seat;
a stay member connected to the body frame under the seat at a position forward of a rearmost portion of the seat, and also extending beyond the seat in an outward direction of the vehicle body; and
a carrier member supported by the stay member to carry luggage;
wherein the stay member includes an outer portion situated beyond the seat in the outward direction of the vehicle body in a plan view and a recess dented upwardly is formed in an underside of the outer portion,
wherein a pair of body connecting bosses is attached to the body frame with a pair of bolts and further comprising:
a second rib provided on an inner portion of the stay member and extending in a vehicle longitudinal direction on an inward side of a first rib in a vehicle-width direction, the second rib being adapted to prevent water from flowing into the vehicle body.

2. The saddle-ride vehicle according to claim 1, wherein the stay member is of steel forging extending horizontally and is placed between the seat and a rear cowl covering a side of the rear portion of the body frame.

3. The saddle-ride vehicle according to claim 2, wherein:
the outer portion of the stay member includes a thicker portion having a thickness greater than the thickness of a general portion of the stay member;
a pair of carrier support bosses projecting in an upward direction of the vehicle body to support the carrier member is provided on the thicker portion; and
the recess is placed between the carrier support bosses.

4. The saddle-ride vehicle according to claim 2, wherein, under the seat, the first rib is integrally formed on the stay member, and projects in the upward direction of the vehicle body beyond a lower end of a vehicle-width-direction side of the seat while extending along an extending direction of the body frame.

5. The saddle-ride vehicle according to claim 1, wherein:
the outer portion of the stay member includes a thicker portion having a thickness greater than the thickness of a general portion of the stay member;
a pair of carrier support bosses projecting in an upward direction of the vehicle body to support the carrier member is provided on the thicker portion; and
the recess is placed between the carrier support bosses.

6. The saddle-ride vehicle according to claim 5, wherein, under the seat, the first rib is integrally formed on the stay member, and projects in the upward direction of the vehicle body beyond a lower end of a vehicle-width-direction side of the seat while extending along an extending direction of the body frame.

7. The saddle-ride vehicle according to claim 1, wherein, under the seat, the first rib is integrally formed on the stay member, and projects in the upward direction of the vehicle body beyond a lower end of a vehicle-width-direction side of the seat while extending along an extending direction of the body frame.

8. The saddle-ride vehicle according to claim 7, wherein:
the stay member is placed to be inclined downwardly toward the front of the vehicle body with respect to a horizontal direction; and
a drain hole placed inward of the first rib in the vehicle-width direction to discharge water is provided in a front portion of the stay member.

9. The saddle-ride vehicle according to claim 1, wherein:
the stay member is placed to be inclined downwardly toward the front of the vehicle body with respect to a horizontal direction; and
a drain hole placed inward of the first rib in the vehicle-width direction to discharge water is provided in a front portion of the stay member.

10. The saddle-ride vehicle according to claim 1, wherein:
the carrier member includes a horizontally extending portion connected to the stay member and having a predetermined width in the vehicle-width direction, and a vertically extending portion extending from the horizontally extending portion in a downward direction of the vehicle body; and
the outer portion of the stay member extends to make contact with an inner face of the vertically extending portion.

11. A saddle-ride vehicle, comprising:
a seat mounted on top of a vehicle body in a rear portion of a body frame;
a stay member connected to the body frame under the seat at a position forward of a rearmost portion of the seat, said stay extending beyond the seat in an outward longitudinal direction of the vehicle body and said stay member includes an outer portion situated beyond the seat in the outward direction of the vehicle body in a plan view and a recess dented upwardly formed in an underside of the outer portion; and
a carrier member supported on the stay member,
wherein a pair of body connecting bosses is attached to the body frame with a pair of bolts, and further comprising:
a second rib provided on an inner portion of the stay member and extending in a vehicle longitudinal direction on an inward side of a first rib in a vehicle-width direction, the second rib being adapted to prevent water from flowing into the vehicle body.

12. The saddle-ride vehicle according to claim 11, wherein the stay member is of steel forging extending horizontally and is placed between the seat and a rear cowl covering a side of the rear portion of the body frame.

13. The saddle-ride vehicle according to claim 12, wherein:
the outer portion of the stay member includes a thicker portion having a thickness greater than the thickness of a general portion of the stay member;
a pair of carrier support bosses projecting in an upward direction of the vehicle body to support the carrier member is provided on the thicker portion; and
the recess is placed between the carrier support bosses.

14. The saddle-ride vehicle according to claim 12, wherein, under the seat, the first rib is integrally formed on the stay member, and projects in the upward direction of the vehicle body beyond a lower end of a vehicle-width-direction side of the seat while extending along an extending direction of the body frame.

15. The saddle-ride vehicle according to claim 11, wherein:
the outer portion of the stay member includes a thicker portion having a thickness greater than the thickness of a general portion of the stay member;
a pair of carrier support bosses projecting in an upward direction of the vehicle body to support the carrier member is provided on the thicker portion; and
the recess is placed between the carrier support bosses.

16. The saddle-ride vehicle according to claim 11, wherein, under the seat, the first rib is integrally formed on the stay member, and projects in the upward direction of the vehicle body beyond a lower end of a vehicle-width-direction side of the seat while extending along an extending direction of the body frame.

17. The saddle-ride vehicle according to claim 16, wherein:
the stay member is placed to be inclined downwardly toward the front of the vehicle body with respect to a horizontal direction; and
a drain hole placed inward of the first rib in the vehicle-width direction to discharge water is provided in a front portion of the stay member.

18. The saddle-ride vehicle according to claim 11, wherein:
the carrier member includes a horizontally extending portion connected to the stay member and having a predetermined width in the vehicle-width direction, and a vertically extending portion extending from the horizontally extending portion in a downward direction of the vehicle body; and
the outer portion of the stay member extends to make contact with an inner face of the vertically extending portion.

* * * * *